(12) United States Patent
Kanemitsu et al.

(10) Patent No.: US 9,021,901 B2
(45) Date of Patent: May 5, 2015

(54) SHOE

(75) Inventors: Hiroshi Kanemitsu, Toyota (JP);
Masaru Yoshikawa, Toyota (JP);
Masaharu Hatta, Toyota (JP)

(73) Assignee: Taiho Kogyo Co., Ltd., Toyota-shi, Aichi (JP)

( * ) Notice: Subject to any disclaimer, the term of this patent is extended or adjusted under 35 U.S.C. 154(b) by 747 days.

(21) Appl. No.: 11/793,124

(22) PCT Filed: Dec. 26, 2005

(86) PCT No.: PCT/JP2005/023772
§ 371 (c)(1),
(2), (4) Date: Jun. 12, 2007

(87) PCT Pub. No.: WO2006/070736
PCT Pub. Date: Jul. 6, 2006

(65) Prior Publication Data
US 2008/0112655 A1    May 15, 2008

(30) Foreign Application Priority Data

Dec. 28, 2004  (JP) ................................ 2004-380507
Apr. 27, 2005  (JP) ................................ 2005-130574

(51) Int. Cl.
*F16C 33/10*    (2006.01)
*F04B 27/08*    (2006.01)

(52) U.S. Cl.
CPC ......... *F04B 27/0886* (2013.01); *F05C 2253/12* (2013.01)

(58) Field of Classification Search
USPC ......... 74/60; 384/293, 13, 450, 625, 284, 285
See application file for complete search history.

(56) References Cited

U.S. PATENT DOCUMENTS

| 5,462,362 | A | * | 10/1995 | Yuhta et al. ..................... 384/13 |
| 5,952,080 | A | * | 9/1999 | Etsion et al. ................... 428/156 |
| 6,263,575 | B1 | * | 7/2001 | Andler et al. ............. 29/898.042 |
| 7,290,936 | B2 | * | 11/2007 | Tsuji et al. ..................... 384/293 |
| 2005/0182494 | A1 | * | 8/2005 | Schmid ......................... 623/23.5 |
| 2009/0031894 | A1 | * | 2/2009 | Kanemitsu et al. ............... 92/71 |

FOREIGN PATENT DOCUMENTS

| JP | 4-75109 | 11/1992 |
| JP | 10-153169 | 6/1998 |
| JP | 2900467 | 3/1999 |
| JP | 2001-279421 | 10/2001 |
| JP | 2002-310157 | 10/2002 |
| JP | 2002-317757 | 10/2002 |

* cited by examiner

*Primary Examiner* — William Kelleher
*Assistant Examiner* — Terence Boes
(74) *Attorney, Agent, or Firm* — Flynn, Thiel, Boutell & Tanis, P.C.

(57) ABSTRACT

A hemispherical shoe 4 is equipped with a sliding surface 4A which slides with a swash plate 3, and a hemispherical convex 4B. Hardening is performed by radiating a laser so that minute circles 6 may be drawn on the sliding surface 4A. Then, lapping is given to the sliding surface 4A and, finally, buffing is given thereto. Thereby, the annular swelling portions 7' and concavities 8' are formed in positions of the circles 6 and, further, lubricating oil passages 10' which include net-like concavities are formed in the sliding surface 4A. A hardening part is formed of the above-mentioned annular swelling portions 7'. The above-mentioned annular swelling portions 7' are formed so that a ratio of an area of a total of all the above-described annular swelling portions 7' occupying an area of the sliding surface 4A which is a hardening object domain may become 0.3 to 0.8. It is possible to provide a shoe 4 which is good in seizure resistance in comparison with the past.

7 Claims, 7 Drawing Sheets

Fig.6
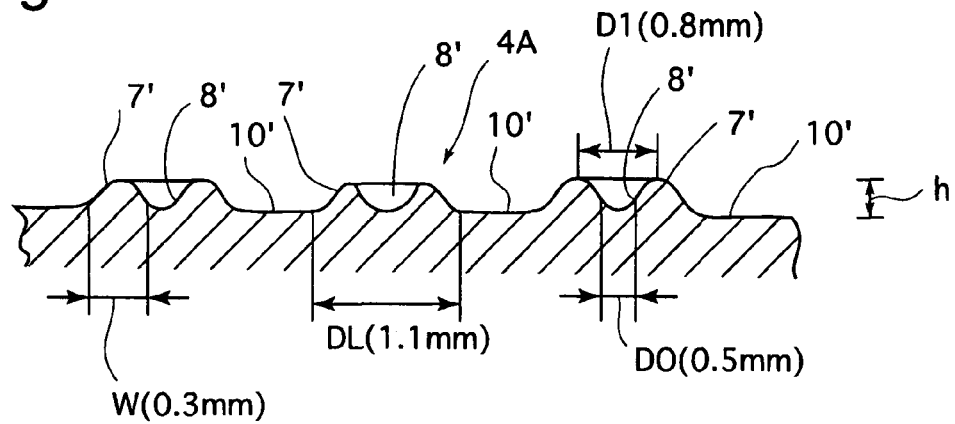
Fig.7
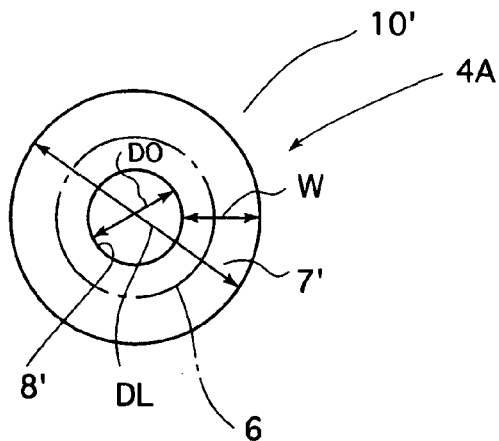
Fig.8
| inner diameter of annular swelling portion Do(mm) | Pitch P(mm) | Convex portion area rate |
|---|---|---|
| 0.1 | 1.1 | 0.31 |
| 0.3 | 1.1 | 0.47 |
| 0.5 | 1.1 | 0.62 |
| 0.7 | 1.1 | 0.56 |
| 1.0 | 1.8 | 0.38 |
| 1.4 | 2.0 | 0.40 |

SHOE

TECHNICAL FIELD

The present invention relates to a shoe, and in particular, to a shoe which is used for a swash plate type compressor, for example, and slides with a swash plate.

BACKGROUND ART

Heretofore, one equipped with a swash plate provided rotatably, and a shoe which has a sliding surface which slides with this swash plate is known as a swash plate type compressor (for example, Japanese Patent Laid-Open No. 10-153169 (Patent Document 1), Japanese Patent Laid-Open No. 2002-317757 (Patent Document 2)).

DISCLOSURE OF THE INVENTION

Issues to be Solved by the Invention

By the way, recently, conventional swash plate type compressors mentioned above are used under conditions of a heavy load at a high speed and a small lubricating oil amount. In this way, recently, operating conditions of a swash plate type compressor have been more severe, and hence, there arise issues that wear of a swash plate or a shoe becomes extreme and, moreover, seizure of them is easy to arise.

Furthermore, in order to enhance a sliding characteristic of a shoe, up to now, processing by applying a surface finishing to a sliding surface of the shoe, or performing reforming is performed, which causes a defect that the manufacturing cost of the shoe becomes expensive, by performing such processing.

Means to Solve the Problems

In consideration of the situations mentioned above, in a shoe equipped with a sliding surface sliding with a swash plate, the present invention not only forms a hardening portion which includes a lot of minute swelling portions on the above-mentioned sliding surface, but also forms the above-mentioned swelling portions so that a convex portion area rate which is a value of S2/S1 may become 0.3 to 0.8, with an area of a hardening object domain in which the above-mentioned swelling portions are formed being S1 and an area of a total of all the swelling portions being S2.

Effect of the Invention

According to such a construction, apparently also from test results mentioned later, it is possible to provide a shoe which is good in seizure resistance in comparison with the past.

BEST MODE FOR CARRYING OUT THE INVENTION

When the present invention is described with respect to the illustrated embodiments below, in FIG. 1, a sliding apparatus 1 is provided in a housing of a swash plate type compressor. This sliding apparatus 1 includes a swash plate 3 which is installed on a rotary shaft 2 rotatably supported in the above-mentioned housing slantly, and a plurality of shoes 4 which slide with this swash plate 3.

The swash plate 3 is formed as a disc and both end faces of this swash plate 3 are flat sliding surfaces 3A and 3A which slide within the shoes 4.

On the other hand, a shoe 4 is formed hemispherically as a whole, and is constructed of a sliding surface 4A which slides with the sliding surface 3A of the above-mentioned swash plate 3, and a hemispherical convex 4B which is hemispherical.

In the housing of the above-mentioned swash plate type compressor, a plurality of pistons 5 are arranged in parallel to the rotary shaft 2 and surround it. A pair of shoes 4 is slidably held in a circular cutout portion 5A formed in one end of each piston 5, and the sliding surface 3A of the swash plate 3 is made to abut on the sliding surfaces 4A of each pair of shoes 4 while the cutout portion 5A in the state is arranged so as to wrap an outer periphery of the above-mentioned swash plate 3.

Then, rotation of the above-mentioned rotary shaft 2 rotates the swash plate 3, the sliding surfaces 3A which are both end surfaces of the swash plate 3 slide with the sliding surfaces 4A of each pair of shoes 4, and in connection with it, each piston 5 is advanced and retracted in an axial direction through each pair of shoes 4.

The construction mentioned above has no difference from a conventional publicly known sliding apparatus.

Hence, the shoe 4 of this embodiment is made from SUJ2, which is an iron-based material, and the generally flat sliding surface 4A which is constructed of end faces has a convex shape where its center side rises up slightly more (about 2 μm) than an outer periphery edge. Thereby, it has a shape that lubricating oil is easy to be drawn between both the sliding surfaces 4A and 3A when the sliding surface 4A slides with the sliding contact surface 3A of the above-mentioned swash plate 3.

Then, in this embodiment, seizure resistance of the sliding surface 4A is enhanced by radiating a laser and performing hardening as mentioned later with making an entire area of the sliding surface 4A of the shoe 4 as a hardening object domain.

That is, when the processing steps of hardening to the sliding surface 4A in this embodiment are described, first, as shown in FIGS. 2 and 3, with making an entire area of the sliding surface 4A of the shoe 4 (parent material), which is produced by making SUJ2 as a material, as a hardening object domain, an YAG laser is radiated so as to draw a plurality of circles 6 having the same diameter.

The diameter of each of the above-described circles 6 is set at 0.8 mm, and the respective circles 6 are made to be drawn with each intersection point as a center in positions of respective intersection points at the time of supposing imaginary parallel lines with the same longitudinal and horizontal pitches P over the entire area of the sliding surface 4A. In this embodiment, the above-described pitch P is set at 1.1 mm, and a hardening width B by irradiating the sliding surface 4A with a laser so as to draw the above-mentioned circles 6 is made to be 0.3 mm (refer to FIG. 5).

In addition, an output of the YAG laser which is radiated on the above-mentioned sliding surface 4A is 50 W, and the YAG laser is made to irradiate a surface of the sliding surface 4A, with adjusting a condenser lens so that the YAG laser may be focused at a position which becomes a depth of 2 mm, that is, in a defocused state to the surface of the sliding surface 4A.

A location of each circle 6 in the sliding surface 4A on which the laser is radiated in this way is swelled annularly as illustrated in FIGS. 4 and 5 to become an annular swelling portion 7, and a tapered concavity 8 having a lower part side becoming narrower is formed in an adjacent inner side of this annular swelling portion 7 in a radial direction. In short, a crater-like annular swelling portion 7 is formed in the location of the circle 6, where the laser is radiated, by irradiating the sliding surface 4A with a laser so as to draw the above-described each circle 6. Furthermore, outside of a radial direction of each annular swelling portion 7, a net-like concavity 10 which communicates with each other and reaches to an outer periphery of the sliding surface 4A is formed.

Each annular swelling portion 7 and location 11 (location in a side upper than a broken line 9) inside its depth direction are given hardening processing with an increasing hardness by about Hv 100 to Hv 750, which is the hardness of the parent material of the shoe 4.

On the other hand, locations (locations of the concavity 8 and net-like concavity 10) inside a radial direction of each annular swelling portion 7 and outside the annular swelling portion 7 in the sliding surface 4A become non-hardening portions by annealing, and those portions are lowered by about Hv 100 in hardness than the parent material.

In this embodiment, first of all, minute annular swelling portions 7 and concavities 8, and net-like concavities 10 are formed by radiating the laser as mentioned above with the entire area of the sliding surface 4A of the shoe 4 as the hardening object domain.

Then, all the annular swelling portions 7 in the above-mentioned sliding surface 4A are once removed by lapping after that for the sliding surface 4A to be made into a smooth surface, and after that, buffing is applied to the sliding surface 4A for the processing to be completed.

In this way, after the processing is completed, as shown in FIG. 6, not only an annular swelling portion 7' similar to the above-mentioned annular swelling portion 7 is formed in the location (location of the above-mentioned annular swelling portion 7) of each circle 6 on which the above-mentioned laser is radiated over the entire area of the sliding surface 4A, but also a concavity 8' similar to the above-mentioned concavity 8 is formed inside a radial direction of each annular swelling portion 7'. Furthermore, outside a radial direction of each annular swelling portion 7', lubricating oil passages 10' constructed of net-like concavities in which lubricating oil is flowable are formed.

This is because the above-mentioned annular swelling portions 7', concavities 8', and lubricating oil passages 10' are formed because portions with a high hardness remain annularly since the hardness of the locations 11 inside the depth direction of the annular swelling portions 7 is higher than the hardness of their peripheral portions by the original annular swelling portions 7 being removed by lapping and buffing being applied after that.

In this embodiment, a hardening portion is formed of annular swelling portions 7' formed in this way. In addition, each concavity 8' functions as a reservoir which stores lubricating oil, and lubricating oil can circulate in the interior of the lubricating oil passage 10'.

In this embodiment, although it is made to apply buffing after applying laser hardening to the sliding surface 4A and applying lapping, as mentioned above, since a grinding amount of the sliding surface 4A in an axial direction by the lapping and buffing is about several μm, an area of the sliding surface 4A does not change substantially.

In addition, as shown in FIG. 6, the height h (depth of the concavity 8') of each annular swelling portion 7' is 0.1 to 0.3 μm, and a maximum width W of a section of the annular swelling portion 7' (radial dimension of a skirt portion) is about 0.3 mm. Thus, a hardening width of the annular swelling portion 7' as the hardening portion is about 0.3 mm. In addition, a diameter D1 of a summit portion of each annular swelling portion 7' becomes 0.8 mm, which is the same as the diameter of the circle 6 at the time of the above-mentioned laser radiation. In addition, as illustrated also in FIG. 7, an outer diameter DL of the annular swelling portion 7' is about 1.1 mm, and an inner diameter D0 of the annular swelling portion 7' becomes about 0.5 mm.

Then, in this embodiment, by letting an area of an entire area of the sliding surface 4A used as the hardening object domain at the time of radiating a laser be S1, and letting a total area of all the annular swelling portions 7' which are formed on the sliding surface 4A be S2, the above-mentioned annular swelling portion 7' is formed so that a value of S2/S1 as the convex portion area rate may become 0.3 to 0.8. In other words, in this embodiment, a ratio of the total area of the portions (annular swelling portions 7') to which laser hardening is actually applied to the area (area of the sliding contact surface 4A) of the hardening object domain is made to become 0.3 to 0.8.

In addition, in the above-mentioned embodiment, although the entire area of the sliding surface 4A is made into the hardening object domain, as illustrated in FIGS. 10 to 12, by letting a principal part of the sliding surface 4A be the hardening object domain A, by radiating a laser on the region A as mentioned above, the annular swelling portions 7' may be formed. In this case, an area of an interior of a minimum imaginary circle or imaginary frame which surrounds the hardening object domain A becomes an area of the hardening object domain A.

In this embodiment which is illustrated in FIG. 2 mentioned above, and in which the entire area of the sliding surface 4A is made into the hardening object domain, a circle 12 becoming a contour of the sliding surface 4A becomes the minimum imaginary circle that surrounds the hardening object domain.

Then, apparently from test results mentioned later, according to this embodiment, the seizure resistance of the shoe 4 can be enhanced. In addition, according to the results of a test which the inventor of the present application performed, in order to obtain better seizure resistance of the shoe 4, it is desirable to form the annular swelling portions 7' so that the above-mentioned convex portion area rate may become 0.45 to 0.8.

FIG. 8 illustrates the difference of the convex portion area rate at the time of changing the pitch P and the inner diameter D0 of the annular swelling portion 7', which are illustrated in the above-mentioned FIG. 3 as the shoe 4 in this embodiment.

Then, FIG. 9 illustrates test results of seizure bearing stress applied to the shoe 4 of this embodiment including what is illustrated in the above-mentioned FIG. 8, and a shoe, which is a usual article, as conventional art.

Here, the shoe of the conventional art is not given laser hardening to its sliding surface and its sliding surface is a flat surface. In addition, brass materials which contain. Mn and Si were used as swash plates as mating materials with the shoes according to the conventional art and this embodiment. The test conditions of the seizure resistance are as follows.
(Test Conditions)

Rotation speed of swash plate: Increase by 9 steps per minute every 1000 rpm: maximum rotation speed: 9000 rpm (peripheral speed: 38 m/s)

Bearing stress: Preload: 2.7 MPa: increase by 2.7 MPa per minute: until arrival in seizure Oil mist amount: 0.05 to 0.25 g/min: fixed nozzle position Oil: Refrigerating machine oil Seizure condition: More than 4.0 N.m of output torque Thus, the rotation speed of the swash plate 3 is increased on the above-mentioned conditions in a state that the sliding surface 4A of the shoe 4 is made to press-contact with the above-mentioned swash plate 3. On the other hand, the bearing stress at the time of making the shoe 4 press-contact with the swash plate 3 was increased on the above-mentioned conditions, and when the output torque applied to the swash plate 3 exceeded 4.0 N·m, it was judged with having arrived in the seizure state. This is the same also with respect to the conventional art.

What are indicated by black dots in FIG. 9 indicate the shoe 4 of this embodiment and when the convex portion area rate is larger than 0.3, good seizure resistance is obtained and, in particular, the seizure bearing stress becomes 19.1 MPa or more in a range that the convex portion area rate becomes 0.45 to 0.8 which becomes an upper limit, and hence, extremely good seizure resistance is obtained. Here, the upper limit means a state that mutually adjacent annular swelling portions 7' are formed on the sliding surface 4A in a densest state without interfering with each other.

On the other hand, what are indicated by white dots in FIG. 9 indicate test results of the conventional article, and all become 5 MPa or less.

Apparently from test results illustrated in FIG. 9, the shoe 4 according to this embodiment has a seizure resistance which is excellent in comparison with the conventional one. Then, as seen from the test result indicated in FIG. 9, in order to obtain better seizure resistance, it is desirable to make the area rate of the above-mentioned annular swelling portions 7' be 0.46 to 0.8.

In addition, on the sliding surface 4A of the shoe 4 of this embodiment, not only the above-mentioned annular swelling portions 7' are formed, but also the concavities 8' which store lubricating oil are formed in its inner radial direction, and lubricating oil is stored inside these concavities 8'. Furthermore, in adjacent positions outside each annular swelling portion 7', lubricating oil passages 10' constructed of net-like concavities are formed. Thereby, it is possible to enhance the load capacity of the sliding surface 4A of the shoe 4 and, by extension, it is possible to provide a shoe 4 which is also excellent in wear resistance.

In addition, in the embodiment mentioned above, by letting the entire area of the sliding surface 4A of the shoe 4 be the hardening object domain by a laser, although the annular swelling portions 7' are formed there, the annular swelling portions 7' may be formed there by letting a necessary area where pressure becomes high when sliding with the swash plate 3 be the hardening object domain by a laser.

That is, as shown in FIG. 10, by letting an inside of an imaginary circle 21 in a central side, except an area in a side of an outer periphery in the sliding surface 4A, be the hardening object domain A, the annular swelling portions 7' may be formed there. In addition, as shown in FIG. 11, by letting a torus-shaped location divided by large and small imaginary circles 22 and 23 in a central side of the sliding surface 4A be the hardening object domain A, the annular swelling portions 7' may be formed there. Furthermore, as shown in FIG. 12, by letting a necessary portion in a circumferential direction in the sliding surface 4A be the hardening object domain A, the annular swelling portions 7' may be formed there.

As shown in these FIGS. 10 to 12, even if the annular swelling portions 7' are formed only in the hardening object domain A which is a part of the sliding surface 4A, it is possible to provide a shoe 4 which is good in seizure resistance by making the convex portion area rate be 0.3 to 0.8.

In each embodiment described above, although each annular swelling portion 7' is formed in an intersection point of parallel lines in longitudinal and horizontal directions, it is also sufficient to form each annular swelling portion 7' in a staggered manner in the sliding contact surface 4A as illustrated in FIGS. 13 and 14. In this case, dimensions such as the pitch P are the same as those of the embodiment in FIG. 3.

Thus, the pitch P is 1.1 mm, the height h (depth of the concavity 8') of each annular swelling portion 7' is 0.1 to 0.3 μm, and a maximum width W of a section of the annular swelling portion 7' (radial dimension of a skirt portion) is about 0.3 mm. In addition, a hardening width of the annular swelling portion 7' is about 0.3 mm, and the diameter D1 of the summit part of each annular swelling portion 7' becomes 0.8 mm. In addition, the outer diameter DL of the annular swelling portion 7' is about 1.1 mm, and the inner diameter D0 of the annular swelling portion 7' becomes about 0.5 mm.

In addition, in the embodiment mentioned above, although all the diameters of the circles at the time of irradiating the sliding surface 4A with a laser are made as the equal diameter, it is also sufficient to form the annular swelling portion 7' so that what is located in a specified position (center position in FIG. 15) is drawn as a circle with a diameter smaller than the others at the time of irradiating the sliding surface 4A with a laser as illustrated in FIG. 15.

Furthermore, it is also sufficient to form the annular swelling portion 7' by irradiating the sliding surface 4A with a laser so that an ellipse may be drawn as shown in FIG. 16, or it is also sufficient to form the swelling portion 7', which is not a closed loop, by irradiating the sliding surface 4A with a laser so that a C shape may be drawn as shown in FIG. 17.

Moreover, it is also sufficient to form the swelling portion 7' by irradiating the sliding surface 4A with a laser so that circles may be drawn in equal pitch on a circumference of an imaginary circle as shown in FIG. 18, or it is also sufficient to irradiate the sliding surface 4A with a laser so that the swelling portions 7' may be dotted on four sides of a imaginary rectangle, as illustrated in FIG. 19.

In addition, although SUJ2 is used as a raw material of the shoe 4 in the embodiments mentioned above, the invention is not limited to this and, of course, it is also sufficient to use other iron-based materials.

Furthermore, instead of the laser hardening by the laser radiation mentioned above, it is also sufficient to form the above-mentioned annular swelling portions or swelling portions by irradiating a sliding surface with an electron beam and performing hardening.

BRIEF DESCRIPTION OF THE DRAWINGS

FIG. 6 is a sectional view of the principal part taken along line VI-VI in FIG. 2;

FIG. 7 is an enlarged top view of the principal part in FIG. 6;

FIG. 8 is a drawing illustrating a convex portion area rate;

Figure 1:
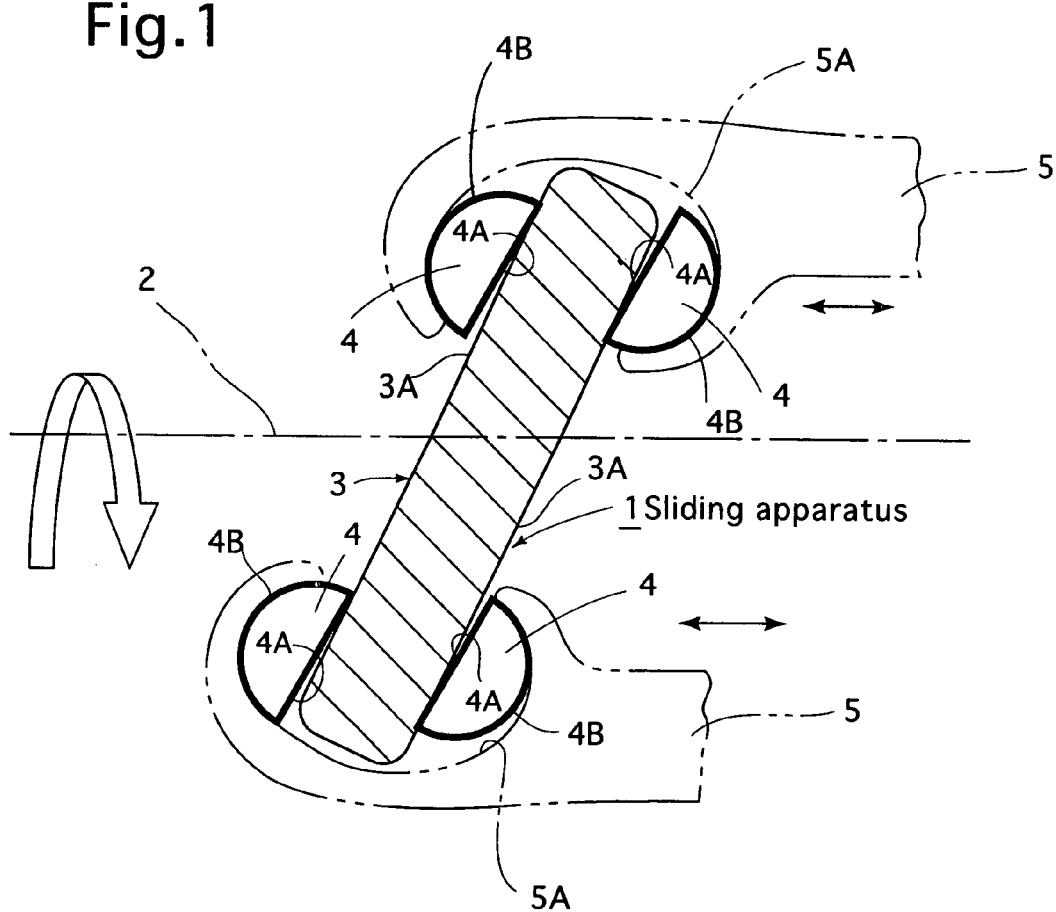
FIG. 1 is a sectional view illustrating one embodiment of the present invention.
Figure 2:
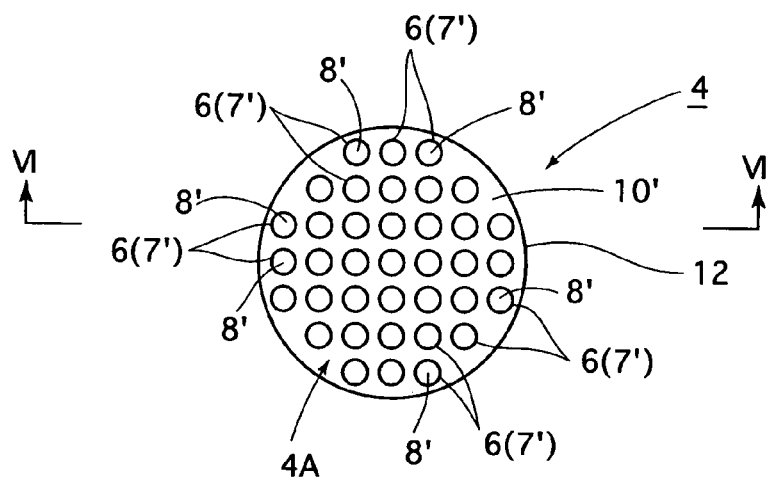
FIG. 2 is a front view of a sliding surface of the shoe illustrated in FIG. 1.
Figure 3:
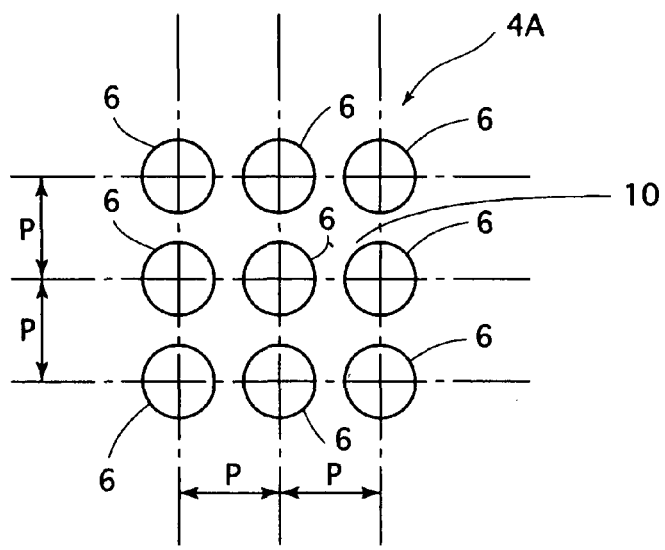
FIG. 3 is an enlarged view of a principal part in production process of the shoe illustrated in FIG. 2.
Figure 4:
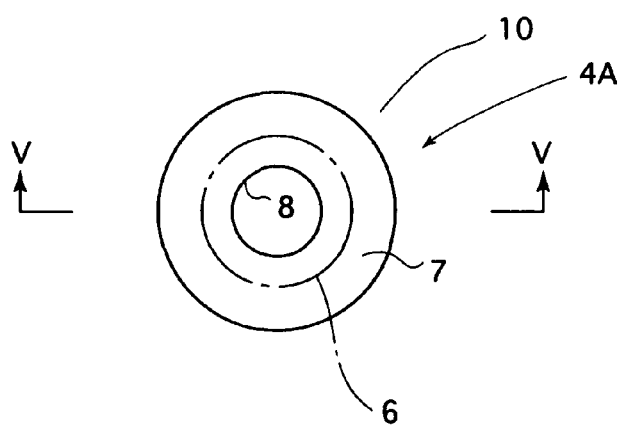
FIG. 4 is an enlarged view of the principal part in FIG. 3.
Figure 5:
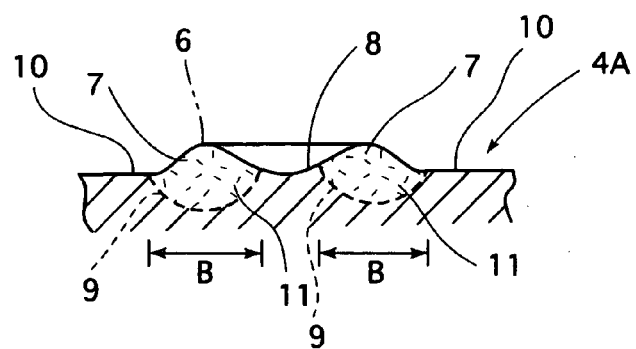
FIG. 5 is a sectional view taken along line V-V in FIG. 4.
Figure 9:
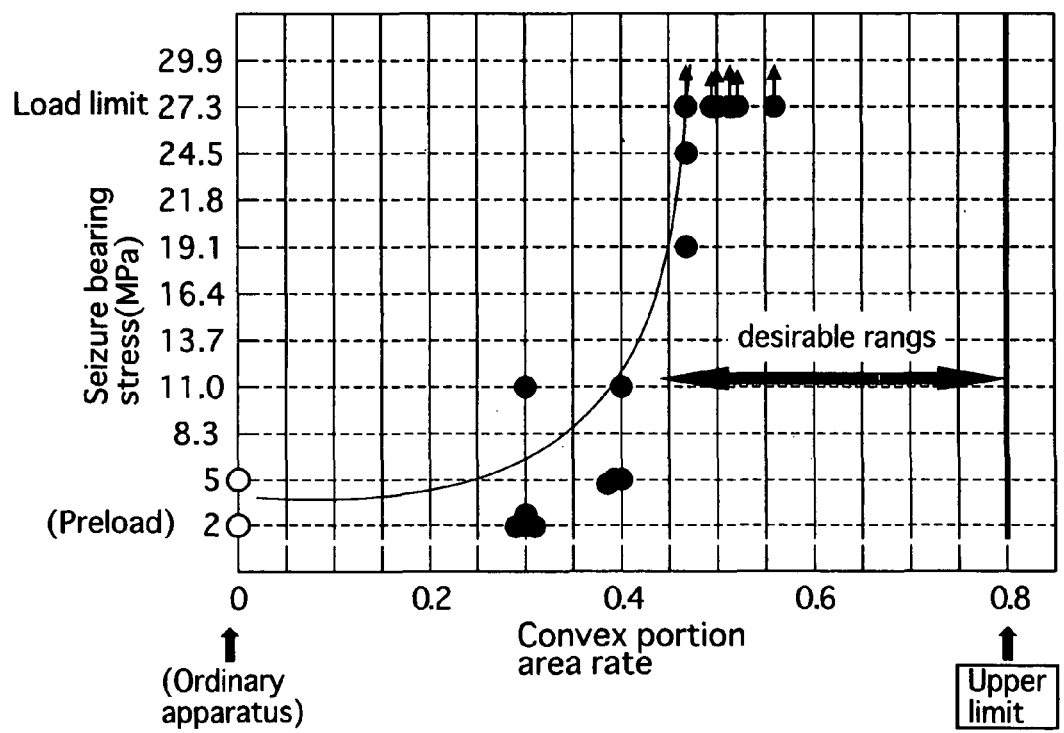
FIG. 9 is a graph illustrating test results of conventional art and the inventive embodiment.
Figure 10:
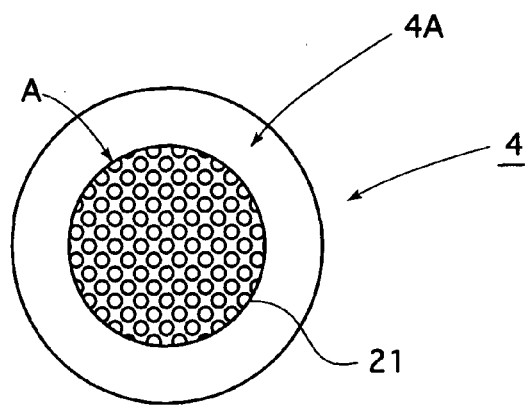
FIG. 10 is a front view of a sliding surface 4a illustrating another embodiment of the present invention.
Figure 11:
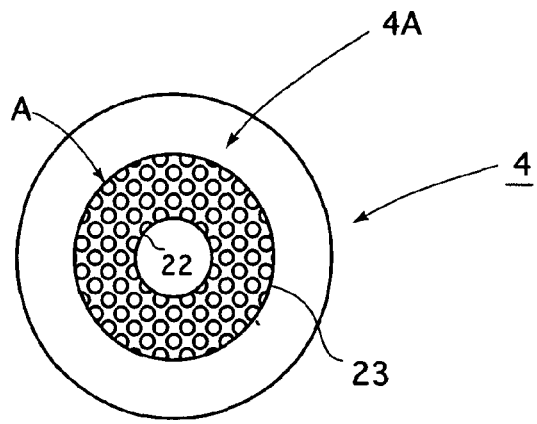
FIG. 11 is a front view of the sliding surface 4a illustrating still another embodiment of the present invention.
Figure 12:
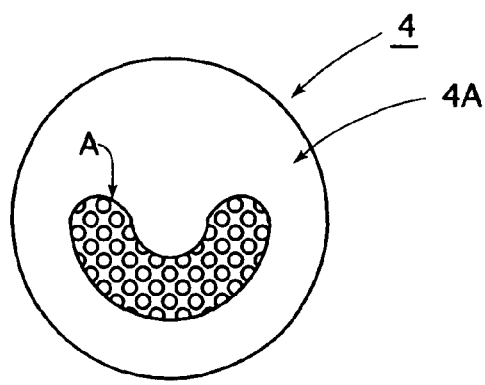
FIG. 12 is a front view of the sliding surface 4a illustrating a further embodiment of the present invention.
Figure 13:
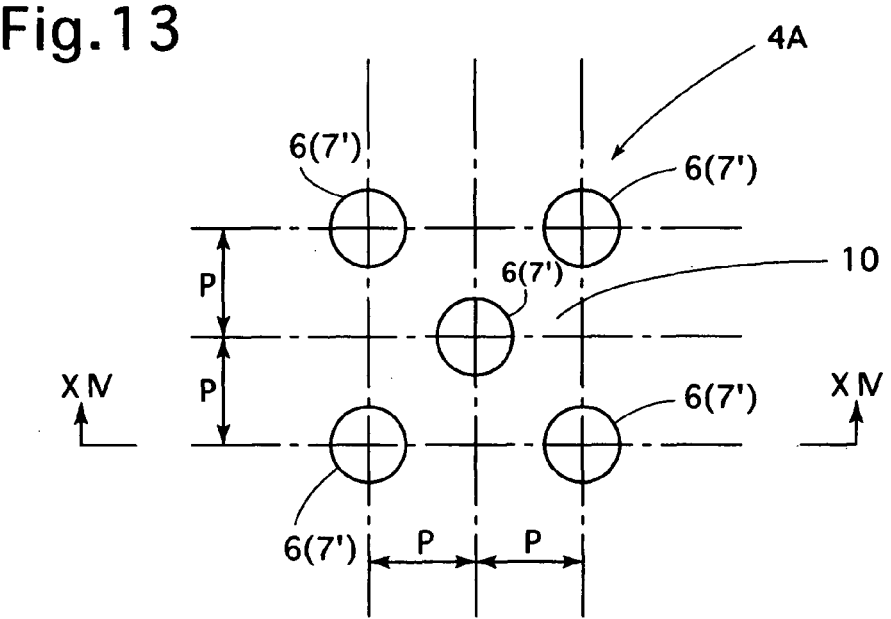
FIG. 13 is an enlarged front view of a principal part of a sliding surface illustrating another embodiment of the present invention.
Figure 14:
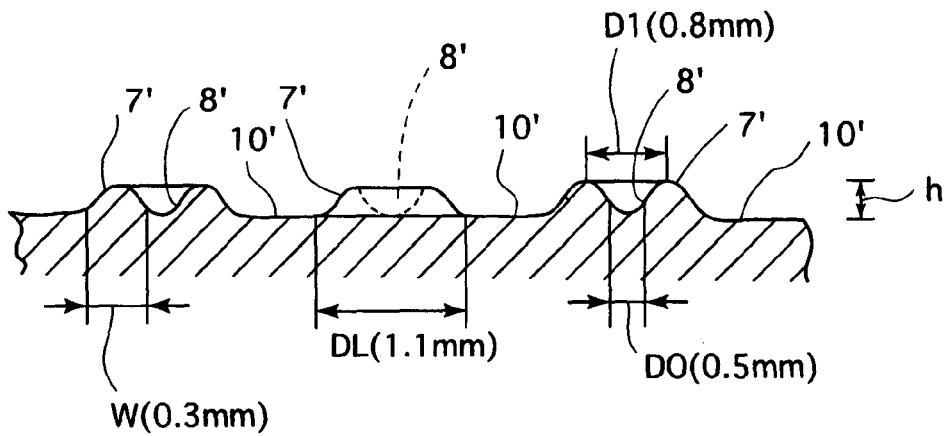
FIG. 14 is a sectional view taken along line XIV-XIV in FIG. 13.
Figure 15:
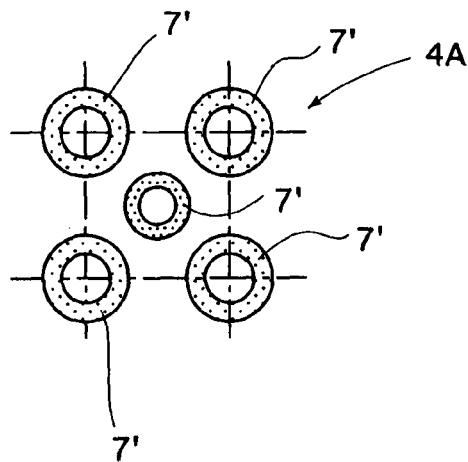
FIG. 15 is an enlarged front view of a principal part of a sliding surface illustrating another embodiment of the present invention.
Figure 16:
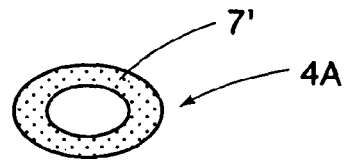
FIG. 16 is a front view of an annular swelling portion illustrating another embodiment of the present invention.
Figure 17:
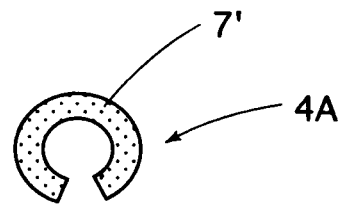
FIG. 17 is a front view of a swelling portion illustrating still another embodiment of the present invention.
Figure 18:
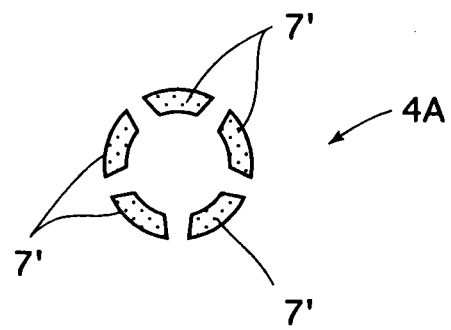
FIG. 18 is a front view of a swelling portion illustrating a further embodiment of the present invention.
Figure 19:
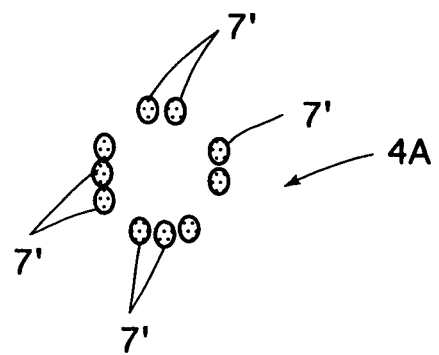
FIG. 19 is a front view of a swelling portion illustrating a still further embodiment of the present invention.

The invention claimed is:

1. A shoe comprising a sliding surface for sliding engagement with a swash plate characterized in that the sliding surface comprises a flat surface having a plurality of annular swelling portions formed thereon, each annular swelling portion surrounding a concavity, wherein the total area of the sliding surface is designated as a hardening object domain S1, the total area of the annular swelling portions is S2 and the annular swelling portions are formed so that a convex area ratio S2/S1 is 0.3 to 0.8, the height of each of the annular swelling portions, as measured from the flat surface to the top of each of the annular swelling portions, is equal to the depth of the concavity surrounded thereby, as measured from the top of the annular swelling portion to the bottom of the concavity surrounded thereby, and the hardness of the annular swelling portions is greater than the hardness of adjacent surrounding portions of the sliding surface.

2. The shoe according to claim 1, characterized in that each annular swelling portion is crater-shaped, has a diameter of less than 2 mm and is formed by irradiating a laser or an electron beam on the sliding surface so that circles or ovals are formed thereon at a predetermined pitch, then applying lapping to the sliding surface and buffing the lapped sliding surface.

3. The shoe according to claim 2, characterized in that an inner radial direction side of each annular swelling portion forms a concavity for storing lubricating oil therein and, in an outer radial direction of each annular swelling portion, lubricating oil passages constructed of concavities for flowing lubricating oil are formed.

4. The shoe according to claim 2, characterized in that the annular swelling portions are formed at positions which are intersection points of parallel lines which are staggered or in longitudinal and horizontal directions over the entire area or a central range of the sliding surface.

5. The shoe according to claim 2, characterized in that the circles or ovals have a diameter of 0.8 mm and a pitch of 1.1 mm and the annular swelling portions have a height of from 0.1 to 0.3 μm.

6. The shoe according to claim 1, characterized in that the convex portion area rate is 0.45 to 0.8.

7. A shoe comprising a sliding surface for sliding engagement with a swash plate characterized in that the sliding surface comprises a flat surface having a hardening portion having a plurality of annular swelling portions with a diameter of less than 2 mm formed thereon, each annular swelling portion surrounding a concavity and the plurality of annular swelling portions are provided in an arc-shaped or annular pattern on the sliding surface, wherein the total area of the sliding surface is designated as a hardening object domain S1, the total area of the annular swelling portions is S2 and the annular swelling portions are formed so that a convex area ratio S2/S1 is 0.3 to 0.8, the height of each of the annular swelling portions, as measured from the flat surface to the top of each of the annular swelling portions, is equal to the depth of the concavity surrounded thereby, as measured from the top of the annular swelling portion to the bottom of the concavity surrounded thereby, and the hardness of the annular swelling portions is greater than the hardness of adjacent surrounding portions of the sliding surface.

* * * * *